(12) United States Patent
Giefer et al.

(10) Patent No.: US 6,662,924 B2
(45) Date of Patent: Dec. 16, 2003

(54) SHIFT BY WIRE SHIFTING DEVICE FOR AN AUTOMATIC TRANSMISSION OF A MOTOR VEHICLE

(75) Inventors: Andreas Giefer, Lemförde (DE); Jörg Meyer, Wagenfeld (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 70 days.

(21) Appl. No.: 09/958,937

(22) PCT Filed: Feb. 8, 2001

(86) PCT No.: PCT/DE01/00492
§ 371 (c)(1),
(2), (4) Date: Oct. 5, 2001

(87) PCT Pub. No.: WO01/59336
PCT Pub. Date: Aug. 16, 2001

(65) Prior Publication Data
US 2002/0170376 A1 Nov. 21, 2002

(30) Foreign Application Priority Data
Feb. 8, 2000 (DE) .......................... 100 05 167

(51) Int. Cl.$^7$ .......................... F16H 63/48; F16H 61/12
(52) U.S. Cl. ................................................ 192/220.7
(58) Field of Search .................... 192/219.4, 219.6, 192/215, 218, 226, 220.3, 220.7; 180/315, 336; 74/469, 491, 500.5

(56) References Cited

U.S. PATENT DOCUMENTS

| | | | |
|---|---|---|---|
| 5,954,179 A | 9/1999 | Osborn | |
| 6,244,127 B1 * | 6/2001 | Benda et al. | 74/473.15 |
| 6,406,102 B1 * | 6/2002 | Arnold | 303/20 |
| 6,508,139 B2 * | 1/2003 | Onodera | 74/335 |
| 2002/0162699 A1 * | 11/2002 | Shiomi et al. | 180/315 |

FOREIGN PATENT DOCUMENTS

| | | |
|---|---|---|
| DE | 4447512 | 3/1996 |
| DE | 19626013 | 12/1997 |
| DE | 19710975 | 9/1998 |
| DE | 19756034 | 7/1999 |
| DE | 19810479 | 9/1999 |
| WO | WO 98/04430 | 2/1998 |

* cited by examiner

Primary Examiner—Saul Rodriquez
(74) Attorney, Agent, or Firm—McGlew and Tuttle, P.C.

(57) ABSTRACT

A shifting device for a powerless or non mechanical transmission of shift commands to an automatic transmission of a motor vehicle includes a shift gate, a gearshift lever mounted pivotably with respect to the shift gate, a detection device for detecting the position of said gearshift lever, and a powerless or non mechanical i.e., by wire) signal transmission device for transmitting shift commands to the automatic transmission. The detection device and/or the transmission device are operated at least partially electrically/electromagnetically. A brake unlocking device is provided for unlocking the parking brake of the automatic transmission. The brake unlocking device includes a mechanical coupling between said gearshift lever and said automatic transmission.

21 Claims, 4 Drawing Sheets

SHIFT BY WIRE SHIFTING DEVICE FOR AN AUTOMATIC TRANSMISSION OF A MOTOR VEHICLE

FIELD OF THE INVENTION

The present invention pertains to a shifting device for the powerless or non mechanical transmission of shift commands to an automatic transmission of a motor vehicle, with a gearshift lever mounted pivotably in at least one shift gate, a detection device for detecting the position of the gearshift lever and a powerless or non mechanical transmission device for shift commands to the automatic transmission, wherein the detection device and/or the transmission device are operated at least partially electrically/ electromagnetically.

BACKGROUND OF THE INVENTION

Such a shifting device has been known from, e.g., patent application DE 197 56 034 A1 (to the present assignee). This patent application discloses a shifting device for an automatic transmission of a motor vehicle, which makes possible the powerless or non mechanical transmission of shift commands to an automatic transmission of a motor vehicle. This shifting device has a housing, a gearshift lever pivotable around a fulcrum point in at least one shift gate, a detection device for detecting the position of the gearshift lever, and an electric signal transmission device for transmitting the shift commands to the automatic transmission.

One problem of such so-called "shift by wire" shifting devices is that normal operation of the transmission becomes impossible in case of power failure, e.g., in case of failure of the battery or the generator. Thus, a vehicle, which was parked overnight and in which subsequently a failure of the power failure occurred, with the transmission in the Park (P) position, can be moved or towed with great effort only, because the transmission in the parking position prevents the movement of the drive wheels. It would consequently be desirable to offer a possibility of shifting the transmission into the neutral position, which makes possible at least towing without the drive wheels being blocked, in an emergency even in the case of so-called "shift by wire" shifting devices and transmissions suitable herefor.

SUMMARY AND OBJECTS OF THE INVENTION

The basic technical object of the present invention is to provide a shifting device for the powerless or non mechanical transmission of shift commands to an automatic transmission of a motor vehicle, which makes it possible to achieve the unlocking of the parking position of an automatic transmission to be operated by the shifting device even when power supply is not present. In addition, an automatic transmission suitable for this shall be provided.

According to the invention, a shifting device for a powerless or non mechanical transmission of shift commands to an automatic transmission of a motor vehicle includes a shift gate, a gearshift lever mounted pivotably with respect to the shift gate, a detection device for detecting the position of said gearshift lever, and a powerless or non mechanical i.e., by wire) signal transmission device for transmitting shift commands to the automatic transmission. The detection device and/or the transmission device are operated at least partially electrically/electromagnetically. A brake unlocking means is provided for unlocking the parking brake of the automatic transmission. The brake unlocking means includes a mechanical coupling between said gearshift lever and said automatic transmission.

In a so-called "shift by wire" shifting device, i.e., a shifting device for the powerless or non mechanical transmission of shift commands to an automatic transmission of a motor vehicle, it is possible despite power failure to unlock the automatic transmission from a parking position of the gearshift lever, in which a parking brake is active and the drive wheels are blocked, and to bring it into a neutral position, in which the drive wheels are freely movable. It is necessary for this to establish a corresponding mechanical coupling between the shifting device and the automatic transmission, which coupling is, however, preferably uncoupled when power supply is available, e.g., with the ignition turned on. The automatic transmission suitable for this must correspondingly have a mechanical connection, by means of which unlocking from the parking position is possible.

Corresponding to the idea of the present invention, it is proposed that the prior-art shifting device for the powerless or non mechanical transmission of shift commands to an automatic transmission of a motor vehicle, with a gearshift lever mounted pivotably in at least one shift gate, with a detection device for detecting the position of the gearshift lever, and with a transmission device for transmitting shift commands to the automatic transmission, wherein the detection device and/or the transmission device are operated at least partially electrically, be improved such that a means for mechanical coupling between the gearshift lever and the automatic transmission is provided, which can bring about the unlocking of the parking position of the automatic transmission. Due to this additional mechanical coupling of the automatic transmission with the shifting device, it is achieved that at least the unlocking of the parking position of the automatic transmission is possible in case of a power failure.

In another embodiment of the shifting device, it is proposed that a preferably electrically operated means be provided for unlocking the mechanical coupling between the gearshift lever and the automatic transmission. Due to this mechanical uncoupling of the shifting device and the automatic transmission, which may be necessary for the satisfactory and normal function depending on the design of the automatic transmission, it is also possible to utilize this function as an additional theft protection or a vehicle immobilizer, because power transmission between the engine and the drive wheels is made possible in the uncoupled state only. The unlocking means may be arranged according to the present invention not only at the shifting device, but also at the transmission, but the forces to be normally applied are stronger in this case than in case of uncoupling directly at the shifting device.

In a special design of the shifting device, provisions are made for the means for the mechanical uncoupling between the gearshift lever and the automatic transmission to have a hook, which can engage a counterpiece, whose movement is coupled with the shifting movement of the gearshift lever.

The means for mechanical coupling between the shifting device and the automatic transmission may be, e.g., a Bowden cable and/or a linkage and/or a hydraulic connection or a linkage.

Furthermore, according to another aspect of the invention, the shifting device may be designed in an especially advantageous embodiment such that the means for the mechanical coupling has two lever arms, wherein the first lever arm is preferably connected pivotably to the shifting device, so that a pivoting actuates the Bowden cable and/or the hydraulic connection to the automatic transmission, and is, furthermore, pivotably connected to the second lever arm, which acts as a hook.

The shifting device now preferably has a spring element between the first and second lever arms, which secures the engagement of the hook with its counterpiece. The spring element may be designed as a coil spring or as a leaf spring. It is used to guarantee a secure connection between the hook and its counterpiece even during vibrations of the vehicle and unfavorable changes in position. The counterpiece may be, e.g., a bolt connected to the gearshift lever or a roller or the gearshift lever itself. The counterpiece may also be an additional hook, which is connected to the gearshift lever and is optionally fastened pivotably.

To make possible the early engagement of the hook in the counterpiece with low force, the second lever arm, especially the hook, may have a sliding surface, which is beveled such that the hook can yield when approaching the counterpiece and then hook in.

Concerning the arrangement and the directions of movement of the two lever arms, it is proposed that the first and second lever arms preferably have two pivot axes, which may be arranged in parallel or at right angles to one another.

Furthermore, it is proposed according to the present invention that the means for unlocking the mechanical coupling between the gearshift lever and the automatic transmission may be an electrically actuated bolt or a switchable pull-type or push-type electromagnet, which can move the hook into an unlocking position.

To embody the idea of the present invention, it is also necessary, besides the design of the shifting device according to the present invention, to design the automatic transmission for connection to this shifting device such that a mechanical, power-controlled input for the direct mechanical unlocking of the parking position, preferably for the transition into a neutral position, be provided besides the input for the powerless or non mechanical transmission of the shift commands from the shifting device.

The transmission may be advantageously designed such that the mechanical input is a connection to a Bowden cable, or that the mechanical input is a connection to a hydraulic line.

Other features of the present invention appear from the subclaims and the following description of a preferred exemplary embodiment with reference to the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
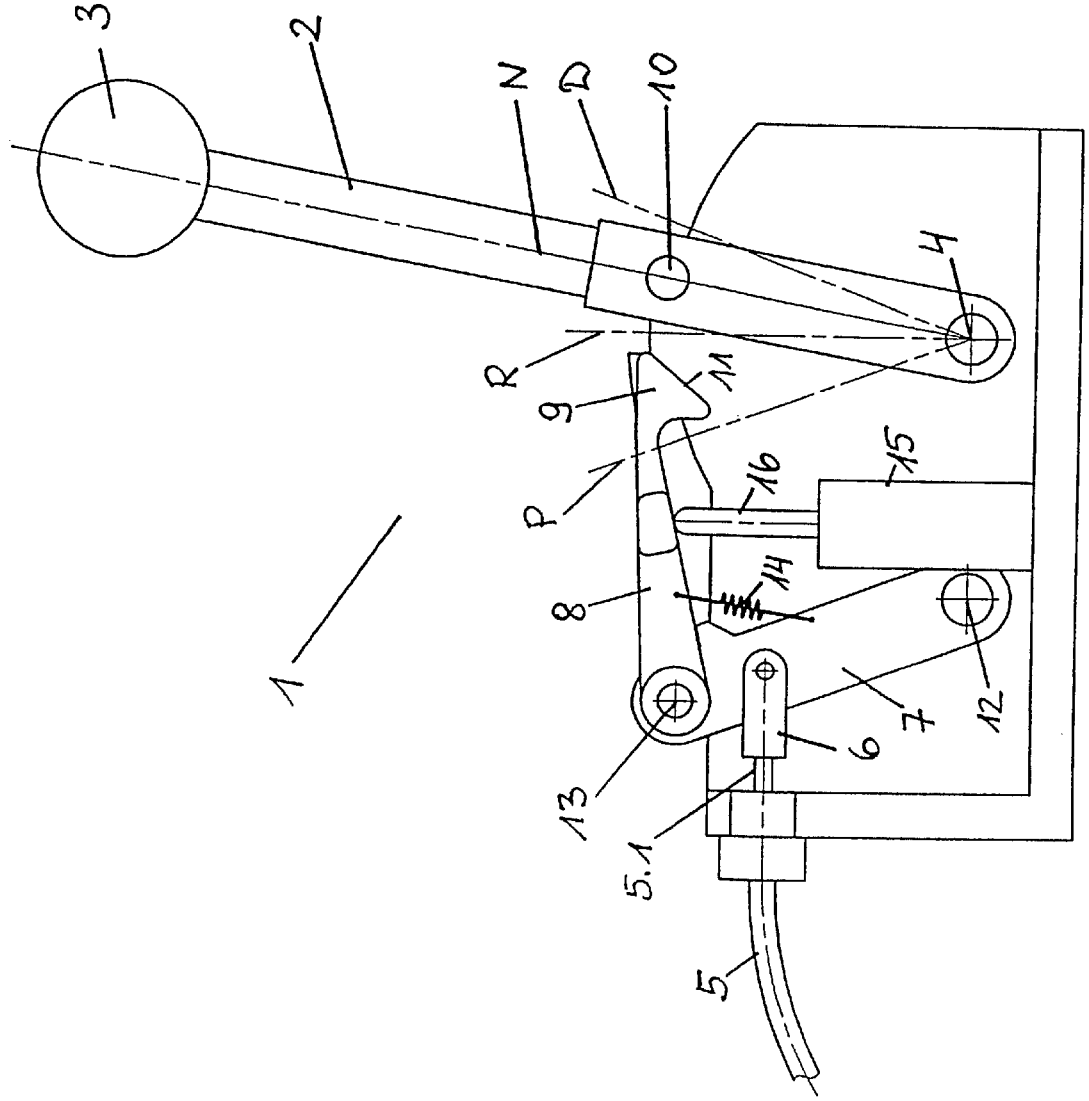
FIG. 1 is a side view of a shifting device according to the present invention, with the gearshift lever in the N position, without mechanical coupling and with the unlocking device in the currentless state.

FIG. 1 shows a side view of a shifting device 1 according to the present invention with a gearshift lever 2, which is in the neutral position. The gearshift lever 2 is pivotable around a pivot axis 4 and can be positioned in the shift positions P, R, N and D in the example being shown here. According to the present invention, the shifting device 1 has a mechanical coupling with an automatic transmission, which is not shown here. The mechanical coupling is brought about by means of a Bowden cable 5, whose cable 5.1 is connected to a first lever arm 7 via a cable clamp 6. The first lever arm 7 with a first pivot axis 12 is pivotably fastened to the shifting device 1. A second pivot axis, at which a second lever 8 is arranged pivotably, is located at the opposite end of the first lever 7. The second lever 8 has at its free end a hook 9, which has an oblique sliding surface 11. An electromagnetic unlocking device 15, which has a bolt 16, which can be withdrawn and extended by electromagnetic action and thus can raise and lower the second lever arm 8, is shown under the free lever 8. Constant contact between the second lever arm 8 and the bolt 16 is brought about by a spring 14, which elastically connects the first lever arm 7 to the second lever arm 8.

A bolt 10, which can act as a counterpiece for the hook 9, is arranged at the gearshift lever 2. If the gearshift lever 2 is pivoted into the P position, the bolt 10 slides up on the sliding surface 11 of the hook 9, pivots the hook 9 upward until engagement of the hook 9 in the bolt 10, supported by the spring 14, is brought about.

Figure 2:
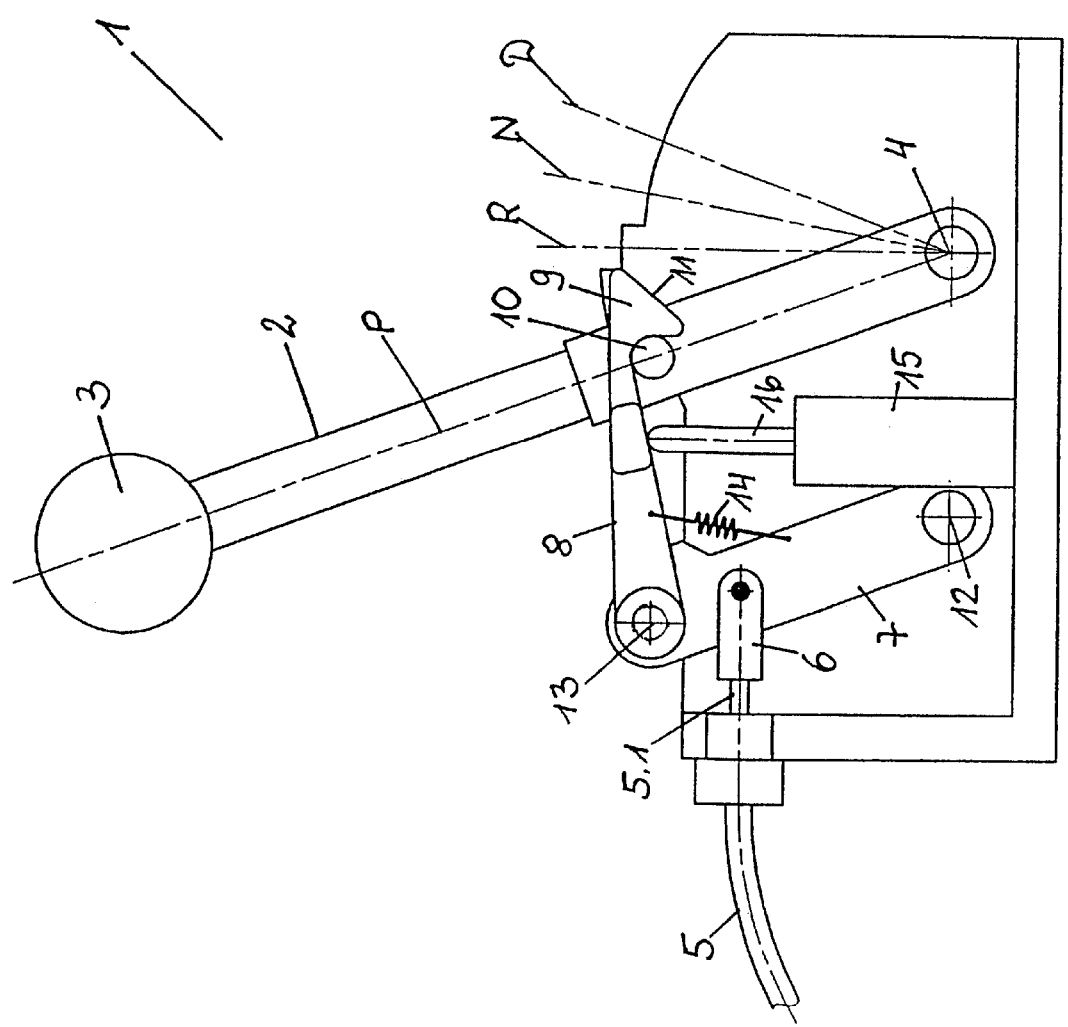
FIG. 2 is a side view of a shifting device according to the present invention, with the gearshift lever in the P position, with the mechanical coupling locked, with the unlocking device in the currentless state.

Such a situation of the engagement of the hook 9 in the counterpiece designed as a bolt 10 can be seen in FIG. 2. As in FIG. 1, the electromagnetic unlocking device 15 is likewise currentless, so that the bolt 16 is in a withdrawn state and does not raise the second lever arm 8 or it allows it to move into a lower position.

If the gearshift lever 2 is pulled into its neutral position by applying force in this situation, in which the electromagnetic unlocking device 15 is currentless, the Bowden cable is pulled out, and this mechanical coupling can be transmitted to the automatic transmission connected thereto.

Figure 3:
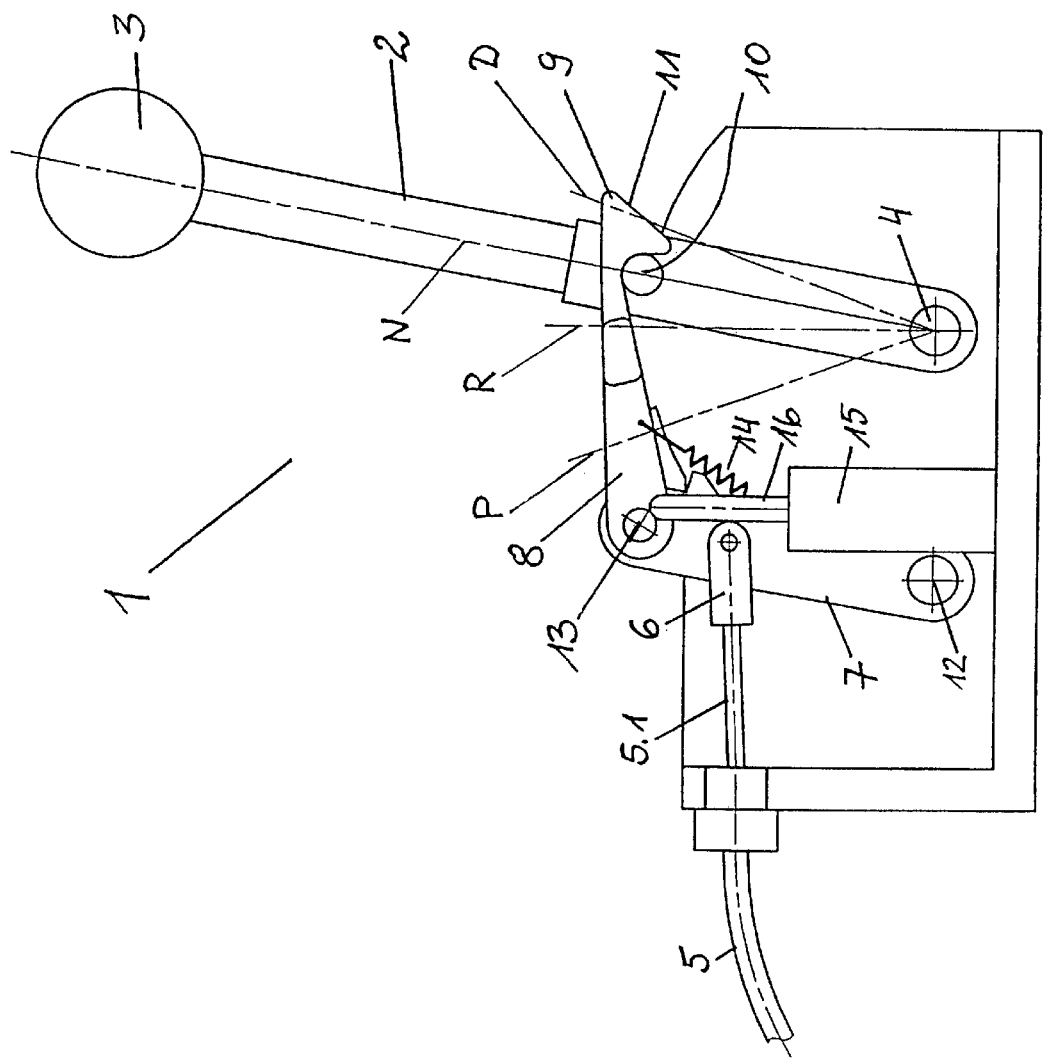
FIG. 3 is a side view of a shifting device according to the present invention, with the gearshift lever in the N position, with the mechanical coupling locked and the transmission unlocked, with the unlocking device in the currentless state.

FIG. 3 shows the shifting device according to the present invention, in which the second lever 8 or the hook 9 is hooked in and the gearshift lever is pivoted back into the neutral position. The unlocking device 15 is not active, so that unlocking of the P position of the automatic transmission can be performed by means of the Bowden cable 5 and free movement of the drive wheels is thus made possible.

Figure 4:
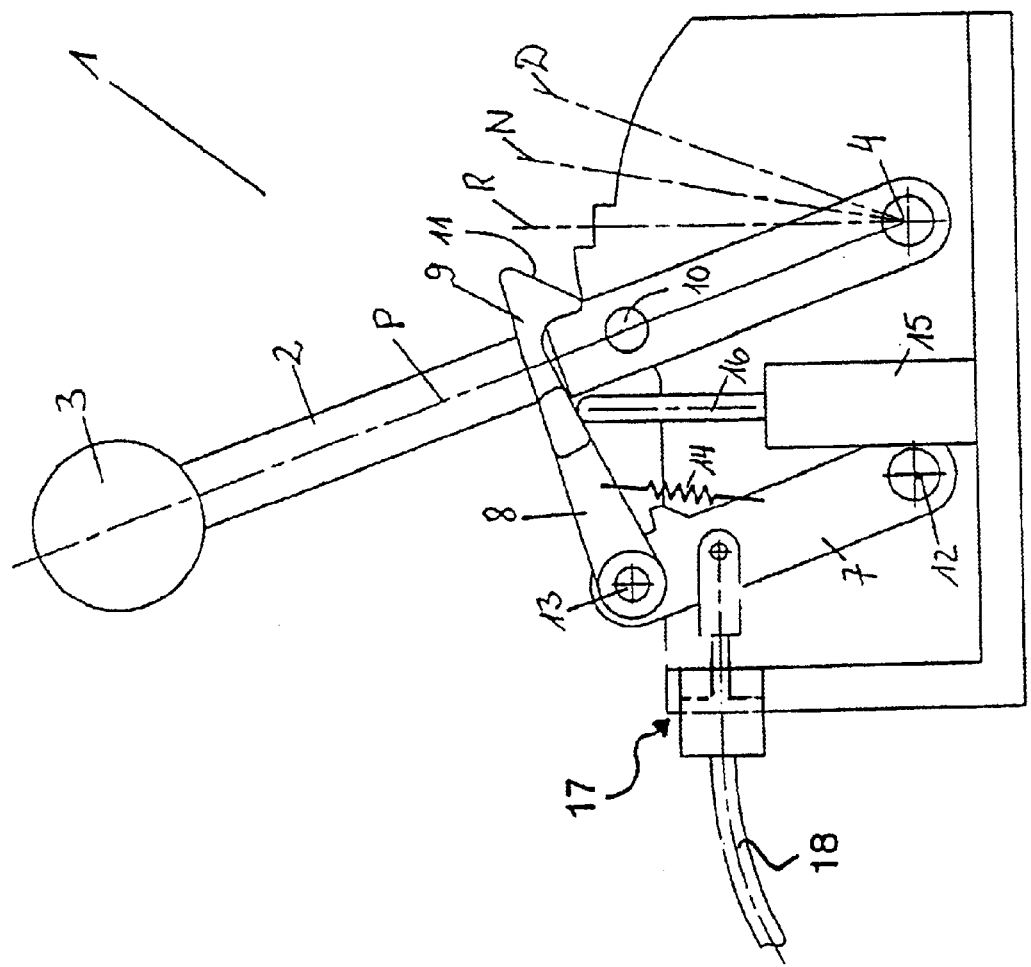
FIG. 4 is a side view of a shifting device according to the present invention, with the gearshift lever in the P position and freely movable, with the mechanical coupling unlocked and the unlocking device active.

If the vehicle with the shifting device according to the present invention is in a normal situation, i.e., sufficient power supply is guaranteed, the electromagnetic unlocking device 15 is actuated, preferably by turning on the ignition, as a result of which the bolt 16 extends and raises the second lever arm 8 of the mechanical coupling device, as shown in FIG. 4. The gearshift lever 2 can be moved into all positions as a result, without a mechanical transmission of power to the automatic transmission connected thereto taking place. FIG. 4 also shows a hydraulic connection 17 to a hydraulic line 18 connectable to an automatic transmission.

Consequently, it is achieved, on the whole, with the shifting device according to the present invention that despite power failure, it is now possible to unlock the transmission from the parking position and thus to release the drive wheels in the case of a "shift by wire" shifting device and a corresponding transmission.

In addition, it is possible to utilize this mechanical coupling as a vehicle immobilizer or theft protection, because, without activation of the unlocking device 15, there is no possibility to shift the transmission normally and independent driving of the vehicle is prevented.

It is obvious that the above-mentioned features of the present invention can be used not only in the particular combination indicated but in other combinations as well or alone, without going beyond the scope of the present invention. A mechanical reversal of the functions of the individual mechanical elements of the present invention is also within the framework of the present invention.

It shall be pointed out that the term "automatic transmission" used in this document also includes so-called "semi-automatic transmissions" which are suitable for connection to so-called "shift by wire" shifting devices, and "shift by wire" includes all types of powerless or non mechanical transmission of shifting information from a shifting device to a transmission, including electronic and optical transmissions ("shift by light").

While specific embodiments of the invention have been shown and described in detail to illustrate the application of the principles of the invention, it will be understood that the invention may be embodied otherwise without departing from such principles.

What is claimed is:

1. A shifting device for non mechanical transmission of shift commands to an automatic transmission of a motor vehicle, the shifting device comprising:
    a shift gate;
    a gearshift lever mounted pivotably with respect to said shift gate;
    a detection device for detecting the position of said gearshift lever;
    a non mechanical transmission device for transmitting shift commands to the automatic transmission, said detection device and/or the transmission device are operated at least partially electrically/ electromagnetically; and
    brake unlocking means for unlocking the parking brake of the automatic transmission including a mechanical coupling between said gearshift lever and said automatic transmission.

2. A shifting device in accordance with claim 1, further comprising:
    an electrically operated means for unlocking the mechanical coupling between said gearshift lever and the automatic transmission.

3. A shifting device in accordance with claim 1, wherein said mechanical coupling includes a hook engaging a counterpiece coupled with said gearshift lever.

4. A shifting device in accordance with claim 1, wherein said mechanical coupling includes a Bowden cable and/or a linkage and/or a hydraulic connection to the automatic transmission.

5. A shifting device in accordance with claim 4, wherein said mechanical coupling includes two lever arms, said first lever arm being connected pivotably to said shifting device such that pivoting actuates said Bowden cable and/or a linkage and/or said hydraulic connection to the automatic transmission, and is, furthermore, pivotably connected to a second lever arm having a hook.

6. A shifting device in accordance with claim 5, wherein said first and second lever arms have a spring element, which secures the engagement of said hook with a hook counterpiece.

7. A shifting device in accordance with claim 6, wherein said spring element is a coil spring or a leaf spring.

8. A shifting device in accordance with claim 3, wherein said counterpiece is a bolt connected to the gearshift lever or a roller or the gearshift lever itself.

9. A shifting device in accordance with claim 6, wherein said hook counterpiece is an additional hook, which is connected to the gearshift lever and is optionally fastened pivotably.

10. A shifting device in accordance with claim 6, wherein said second lever arm with said hook has a sliding surface, which is beveled such that said hook can yield during the approach of said hook counterpiece and then hooks in.

11. A shifting device in accordance with claim 5, wherein said first and second lever arms have two pivot axes arranged in parallel to one another.

12. A shifting device in accordance with claim 2, wherein said electrically operated means is an electrically actuated bolt.

13. A shifting device in accordance with claim 2, wherein said electrically operated means is a switchable pull-type or push-type electromagnet for moving said hook into an unlocking position.

14. A shifting device for a transmission of a motor vehicle, the shifting device comprising:
    a shift gate;
    a gearshift lever mounted pivotably with respect to said shift gate;
    a detection device for detecting a position of said gearshift lever;
    a transmitting device for transmitting shift commands to the transmission, said detection device and/or said transmitting device are operated at least partially electrically/electromagnetically;
    brake unlocking means for unlocking the parking brake of the transmission, said brake unlocking means including a mechanical coupling between said gearshift lever and the transmission;
    an electrically operated means for unlocking said mechanical coupling between said gearshift lever and the transmission.

15. A shifting device for a transmission of a vehicle, the device comprising:
    a shift gate;
    a gearshift lever pivotally mounted in said shift gate;
    a detection device detecting a position of said gearshift lever with respect to said shift gate, and generating a shift signal indicating said position;
    a transmitting device transmitting said shift signal to the transmission, one of said detection device and said transmitter being electrically operated;
    a mechanical bypass selectively mechanically connectable to said gearshift lever and to the transmission, said mechanical bypass mechanically connecting said gearshift, lever to the transmission to have said gearshift lever mechanically shift the transmission.

16. A device in accordance with claim 15, wherein:

said transmitting device non-mechanically transmits said shift signal to the transmission.

17. A device in accordance with claim 15, further comprising:

an override selectively disabling said mechanical bypass.

18. A device in accordance with claim 15, wherein:

one of said detection device and said transmitting device require electrical energy to operate.

19. A device in accordance with claim 17, wherein:

one of said detection device and said transmitting device require electrical energy to operate;

said override disables said mechanical bypass when said one of said detection device and said transmitting device have electrical energy to operate.

20. A device in accordance with claim 15, wherein:

said mechanical bypass selectively connects said gearshift lever to the transmission when one of said detection device and said transmitting device are non-operational.

21. A device in accordance with claim 15, wherein:

the transmission has a lock position which locks wheels of the vehicle and a neutral position;

said mechanical bypass shifts the transmission between said lock and neutral positions.

* * * * *